United States Patent Office 3,366,708
Patented Jan. 30, 1968

3,366,708
POLYURETHANES FORMED BY REACTING LACTONE POLYESTERS, PHOSGENE, AND AN ALIPHATIC DIAMINE
Alan B. Magnusson, East Hempfield Township, Lancaster County, Pa. (1142 Nissley Road, Lancaster, Pa. 17601), and John A. Parker, 22938 McClure Lane, Los Altos, Calif. 94022
No Drawing. Filed Apr. 13, 1964, Ser. No. 359,482
5 Claims. (Cl. 260—859)

ABSTRACT OF THE DISCLOSURE

A non-aromatic polyurethane formed from the reaction of phosgene, and an hydroxy terminated lactone polyester having a number average molecular weight of 450 to 5,000, cross-linked with a primary or secondary aliphatic diamine. The resulting polyurethane is useful in combination with vinyl chloride resins as flooring compositions.

This invention relates to a non-aromatic polyurethane, and more particularly to a polyurethane prepared by a method other than that which uses an aromatic diisocyanate. Still more particularly, the invention relates to a light- and heat-stable non-aromatic polyurethane which is compatible with poly(vinyl chloride) and which plasticizes poly(vinyl chloride) compositions.

Compositions containing poly(vinyl chloride) and vinyl chloride-vinyl acetate copolymers find wide applications as flooring compositions. These vinyl compositions however always require plasticizers and stabilizers to render the flooring composition stable under prolonged and stringent conditions of traffic and to maintain the composition stable under heat and light. It has been known that polyurethane compositions serve to strengthen these vinyl resin flooring compositions. However, one of the great disadvantages of aromatic diisocyanate-prepared polyurethanes has been their instability to the prolonged warmth and light normally encountered in flooring applications.

It is therefore the primary object of the present invention to present a non-aromatic polyurethane which will strengthen vinyl chloride resin compositions and yet which will be completely compatible in those compositions and which will remain substantially unchanged under the usual conditions of exposure to heat and sunlight. It is another object of the present invention to present a method of making such a polyurethane.

These objects are achieved in a surprisingly straightforward and effective manner. The invention contemplates forming a non-aromatic polyurethane by first forming a bis-chloroformate. The bis-chloroformate is made by reacting phosgene with a hydroxyl-terminated polyester of the formula

wherein $x$ and $y$ are numbers sufficient to give the polyester a number average molecular weight in the range of about 450–5,000, preferably 2,000. R in the polyester is a divalent radical selected from the group consisting of saturated hydrocarbon, olefinically unsaturated hydrocarbon, saturated hydrocarbon containing ether groups, and olefinically unsaturated hydrocarbon containing ether groups. This bis-chloroformate is then reacted with an aliphatic diamine, either a primary or, preferably, a secondary diamine to form the non-aromatic polyurethane which may be recovered from the reaction medium.

The hydroxyl-terminated polyesters which are the starting point of the present invention are those described in U.S. Patent No. 2,878,236, the disclosure of which is hereby incorporated herein by reference. The polyesters are made by starting with the cyclic lactone epsilon caprolactone to form a poly(epsilon caprolactone), abbreviated PECL. A substituted epsilon caprolactone such as methyl epsilon caprolactone may be used to form the poly (methyl epsilon caprolactone) abbreviated PMECL. The starting cyclic lactone is treated with a polyol initiator, preferably a diol, the diol containing two hydroxyl groups, the balance of the molecule being a saturated hydrocarbon, an olefinicaly unsaturated hydrocarbon, or a hydrocarbon contining one or more ether groups either saturated or olefinically unsaturated. The presence of olefinic unsaturation in the diol initiator is advantageous in that one or more unsaturated linkages are preserved through to the final polyurethane in which they may serve as a convenient cross-linking site, particularly for a peroxide cure. One such double bond is preferred. Actual formation of the polyesters is easily accomplished simply by mixing the caprolactone and the diol initiator and heating under an inert blanket of gas. Heating temperatures generally range from 50° to about 300° C., although lower temperatures in the range of 150–200° C. are generally preferred. The hydroxyl group on the initiator apparently easily opens the lactone ring, and the presence of a catalyst hastens the reaction. These catalysts are generally chelates or metal acrylates of fatty acids, metal allyls, or Lewis acids. Heating is continued until the refractive index becomes constant or at least reaches that which is desired. Polyesters having a molecular weight in the stated range are generally waxy solids.

These polyesters are to be reacted with phosgene in order to form a bis-chloroformate. Two moles of phosgene plus the usual excess will be used for each mole of polyester. Preferably the polyester is dissolved in a solvent such as a chlorinated hydrocarbon, cooled, and phosgene bubbled into the mixture. Generally temperatures in the range minus 70° C. to about 0° C. will be used. Preferably the polyester will be added to the phosgene in solution, but phosgene may be added to the polyester solution. In either case, when the reaction is complete, the mixture will be allowed to reach room temperature at which it may stand with stirring for several hours. An inert gas such as dry nitrogen may be bubbled into the reaction mixture to purge it of phosgene. Light vacuum will pull off any remaining phosgene, hydrochloric acid, and some of the solvent which makes up the reaction medium. All solvent may be removed by distillation if desired. Isolation of the bis-chloroformate is not needed, once any excess phosgene has been removed, since its reaction with the diamine is conveniently carried out from the reaction medium in which the bis-chloroformate was originally prepared.

The reaction of the bis-chloroformate with the aliphatic diamine is preferably carried out by means of the well-known interfacial polymerization technique. With this technique, the bis-chloroformate is maintained in a chlorinated hydrocarbon layer or other suitable solvent system immiscible with water, while the diamine is taken up in the water layer to form the aqueous portion of the reaction medium. Examples of usable amines are ethylene diamine, hexamethylene diamine, decamethylene diamine, xylene diamine, bis(3-aminopropyl) ether, bis(3-aminopropyl) ether of diethylene glycol, bis(1,4-aminomethyl) cyclohexane, piperazine, 2 - methylpiperazine, 2,5 - dimethylpiperazine, N,N'-diethylethylene diamine, and N,N'-dimethylhexamethylene diamine. The diamines have no reactive groups, other than the amine groups, which will react under the conditions of this reaction. The diamine in water will generally be admixed with a strong, alkaline compound such as sodium hydroxide, potassium hydroxide, sodium carbonate, and the like in order that the hydrochloric acid released will be taken up by the alkaline compound. The aqueous solution containing the diamine and the alkaline compound may be rapidly added to a thoroughly agitated solution of the bis-chloroformate in its solvent in order for reaction to take place. Polymerization occurs rapidly. The polymer, the resulting polyurethane, may be washed repeatedly with water and with hydrochloric acid solution in order to remove all solvents and salts therefrom. If very pure aliphatic polyurethane is desired, the polymerization product may be taken up in a solvent such as acetone and precipitated with water.

A wide variety of solvents for the bis-chloroformate may be used such as benzene, toluene, carbon tetrachloride, methylene chloride, chloroform, and most of the chlorinated alkyls. The solvents will be non-reactive with the bis-chloroformate or any other ingredients and will be useful so long as the bis-chloroformate dissolves in it. Instead of using an alkaline material as described above, it is possible to simply use excess diamine as the alkaline material to take up the released hydrochloric acid, although such is an expensive way to remove the hydrochloric acid from the sphere of the reaction.

Temperature of reaction of the diamine with the bis-chloroformate will generally be in the range of 0° to 30° C. After the polymer has been formed and washed, it will generally be dried. This may be done by placing it in an air-circulating or vacuum oven at a suitably elevated temperature, for example, in the range of about 40–60° C.

Generally speaking, the concentration of the bis-chloroformate in its solvent for reaction with the diamine will be in the range of about 10% to 50% by weight. The diamine concentration in water will be in the range preferably of about 1% to 10% by weight. An excess of alkaline material in the reaction medium will do no harm.

The dried polymer may be used as a plasticizer in vinyl resins by mixing a composition to serve the purpose intended in a mixer such as a Banbury mixer. Plasticizing amounts generally in the range of about 10% to 50% by weight of the polyurethane based on the weight of the vinyl resin-polyurethane mixture will be used. The resulting mixture may be sheeted on a two-roll mil. The sheets may be cut into tiles or affixed to a backing by normal processing methods. Alternatively, chips may be formed from the resulting mixture and the chips laid up on a backing to be subsequently consolidated thereon.

The polyurethanes of the present invention are not film formers in the usual sense of the term and they have no elastomeric properties at all. However, in admixture with poly(vinyl chloride) and vinyl acetate-vinyl chloride copolymers they serve as an excellent compatible, non-migrating, stable plasticizing agent which yields tough, color-stable vinyl resin compositions.

The following examples illustrate several embodiments of the invention. All parts are by weight unless otherwise stated.

EXAMPLE 1

A series of polyesters was made starting with epsilon caprolactone or epsilon methyl caprolactone or mixtures thereof. In each case the apparatus used was a 5-liter multi-necked flask fitted with stirrer, thermometer, condenser, nitrogen inlet tube and heating mantle. In a typical run to yield polyester of 2,000 number average molecular weight, 1,938 parts (17 moles) epsilon caprolactone and 62 parts (1 mole) ethylene glycol were used. After mixing and applying a nitrogen blanket, 2 parts of dibutyl tin dilaurate was added from a syringe. The mixture was stirred and heated to 170–180° C. and maintained at this temperature for 2 hours until the refractive index became constant. The refractive index was taken at 60° C. since the polyester was a white solid wax upon cooling.

The same procedure was used for epsilon methyl caprolactone, EMCL, except that tetrabutyl titanate was used as the catalyst. The polyester in this case was a viscous liquid. All the polyesters had acid numbers of 1.0 or less if distilled starting materials were used.

Several methods of making the polyurethane were used. These are as follows:

*Method A.*—A solution of 0.1 mole polyester in 400 ml. methylene chloride was added dropwise during 1½ hours to a stirred solution of 0.5 mole, 50 g., phosgene in 300 ml. methylene chloride, cooled in a Dry Ice-acetone bath to minus 65° C. The temperature rose slowly during the addition and subsequently was allowed to reach room temperature. After standing 16 hours at room temperature, phosgene and HCl were purged from the system with dry nitrogen and the solvent removed under vacuum while heating with a water bath.

The resulting bis-chloroformate was dissolved in benzene and the volume adjusted to 600 ml. This solution was added as rapidly as possible to 450 ml. of aqueous solution containing 9.3 g. 0.117 mole piperazine and 9.0 g., 0.225 mole sodium hydroxide, which was stirred rapidly with a Dispersator. The polymerization was complete within 2–5 minutes forming a thick emulsion. This product was dissolved in 2 liters of acetone with stirring and the polymer precipitated by pouring or dropping the solution into 16 liters of water. The solution and precipitation was repeated twice more to remove inorganic salts and excess piperazine. The washed polyurethane was dried in a vacuum oven at 60–75° C. The inherent viscosity, $\eta_{inh}$, was determined on a 0.5 g./100 ml. solution of the polyurethane in toluene at 30° C.

*Method B.*—Same as Method A except a Waring Blendor was used for stirring during polymerization instead of a Dispersator.

*Method C.*—Same as Method A except toluene was used as the solvent for the phosgenation reaction.

*Method D.*—Same as Method C except that other diamines were used in the polymerization.

*Method E.*—Same as Method C except that the concentration of the bis-chloroformate solution in the polymerization step was varied.

*Method F.*—Same as Method C except toluene was used as the solvent for the bis-chloroformate in the polymerization.

*Method G.*—Same as Method C except methylene chloride was used as the solvent for the bis-chloroformate in the polymerization.

*Method H.*—Same as Method C except a laboratory paddle-type stirrer was used in the polymerization.

*Method J.*—Same as Method F except a Waring Blendor was used in the polymerization.

*Method K.*—Same as Method J except the concentration of bis-chloroformate solution was varied in the polymerization step.

| Examples | Polyester | Mol. Wt. | Initiator | Diamine | $\eta_{inh}$ |
|---|---|---|---|---|---|
| Method A | PECL | 1,000 | 1,4-butanediol | Piperazine | 0.99 |
| | PECL | 2,000 | do | do | 0.77 |
| | PECL | 2,800 | do | do | 1.04 |
| | PMECL | 2,000 | do | do | 0.79 |
| | Copolymer 75% ECL 25% MECL. | 2,000 | do | do | 1.03 |
| | Copolymer 50% ECL 50% MECL. | 2,000 | do | do | 0.74 |
| | PECL | 4,000 | 2-butene-1,4-diol | do | 1.27 |
| | PECL | 2,000 | do | do | 0.83 |
| Method B | PECL | 2,000 | 1,4-butanediol | do | 0.86 |
| Method C | PECL | 2,000 | 2-butene-1,4-diol | do | 0.92 |
| | PECL | 2,000 | 1,4-butanediol | do | |
| | PECL | 3,000 | 2-butene-1,4-diol | do | 0.92 |
| | PECL | 2,000 | do | do | 0.89 |
| | PECL | 1,000 | do | do | 0.44 |
| | PECL | 2,000 | 1,3-butanediol | do | 0.51 |
| | PECL | 2,000 | 2-ethyl-2-allyloxymethyl-1,3-propanediol. | do | 0.60 |
| Method D | PECL | 2,000 | 2-butene 1,4-diol | 2-methyl Piperazine | 0.60 |
| | PECL | 2,000 | do | Hexamethylene Diamine | 0.67 |
| | PECL | 2,000 | do | M-Xylylene Diamine | 0.34 |
| Method E | PECL | 2,000 | do | Piperazine | |
| | Volume of bis-chloroformate solution | | | (1) 300 ml | 1.3 |
| | | | | (2) 500 ml | 1.09 |
| Method F | PECL | 2,000 | 2-butene-1,4-diol | Piperazine | 0.49 |
| Method G | PECL | 2,000 | do | do | 0.98 |
| Method H | PECL | 2,000 | do | do | 1.0 |
| | PECL | 2,000 | 1,4-butanediol | do | 1.0 |
| Method J | PECL | 2,000 | 1,3-propanediol | do | 0.92 |
| Method K | PECL | 2,000 | 2-butene-1,4-diol | Piperazine | |
| | | | | Piperazine | |
| | Volume of bis-chloroformate solution | | | (1) 500 ml | 0.65 |
| | | | | (2) 1,000 ml | 1.09 |

EXAMPLE 2

Linear polyurethane from polycaprolactone polyester and piperazine was used as the plasticizer in an unfilled poly(vinyl chloride) formulation.

*Method I.*—All ingredients were mixed in a Banbury mixer at 320° F. three times to ensure homogeneity. The mixture was then milled into 0.075 inch sheets on a two-roll mill with the front roll at 290° F. and the back roll at 270° F. Squares 9 inches by 9 inches were cut from the milled sheet and pressed in a Wabash hydraulic press to 0.070 inch thickness at 320° F. using a two minute preheat at 3,000 p.s.i. (ram pressure) and two and one-half minute press at 6,000 p.s.i. (ram pressure). The platens were then cooled with water while maintaining 3,000 p.s.i. pressure.

*Method II.*—Polyurethane plasticizer was first placed on the warm mill rolls to soften, then remainder of resin mixture added and rolls heated to 300–320° F. Milled until fused. Sheets were cut and pressed as described in Method I.

*Method III.*—A mixture of all ingredients except the plasticizer was prepared in a Hobart mixer. This resin mix was then placed in a two roll mill heated to 300–320° F. The polyurethane plasticizer was added to the hot-resin mix on the mill and mixed until fused and homogeneous. The milled sheets were then cut and pressed as described in Method I.

The products were tough, strong, and flexible, and were suitable for use as floor coverings.

We claim:

1. A non-aromatic polyurethane comprising the reaction product of an aliphatic diamine selected from the group consisting of primary amines and secondary amines and a bis-chloroformate which is the reaction product of phosgene and a polyester of the formula

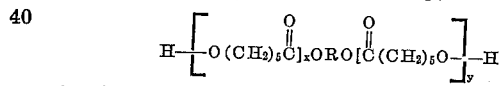

wherein $x$ and $y$ are whole numbers of sufficient size to give the polyester a number average molecular weight in the range of about 450–5,000, and wherein R is a divalent radical selected from the group consisting of saturated hydrocarbon, olefinically unsaturated hydrocarbon, saturated hydrocarbon containing ether groups, and olefinically unsaturated hydrocarbon containing ether groups.

2. A polyurethane according to claim 1 wherein said diamine comprises piperazine.

3. A polyurethane according to claim 1 in which said polyester has a molecular weight of about 2,000.

4. A polyurethane according to claim 1 wherein said divalent radical contains olefinic unsaturation.

5. A composition containing a vinyl resin selected from the group consisting of poly(vinyl chloride) and a

| | Polyurethane | | | | |
|---|---|---|---|---|---|
| | Polyester | Mol. Wt. | Initiator | Diamine | Method of Prep. |
| Method I | PECL | 2,000 | 2-butene-1,4-diol | Piperazine | H |
| Method II | PECL | 2,000 | do | do | F |
| Method III | PECL | 2,000 | do | 2-methyl Piperazine | F |
| | PECL | 1,000 | 1,4-butanediol | Piperazine | A |
| | PECL | 2,000 | do | do | A |
| | PECL | 2,800 | do | do | A |
| | Copolymer: 75% ECL 25% MECL. | 2,000 | do | do | A |
| | Copolymer: 50% ECL 50% MECL. | 2,000 | do | do | A |
| | PMECL | 2,000 | do | do | A | vinyl chloride-vinyl acetate copolymer and, as a plasticizer thereof, 10%–50% by weight of the polyurethane of claim 1, based on the weight of the polyurethane-vinyl resin mixture.

References Cited

UNITED STATES PATENTS

| | | | |
|---|---|---|---|
| 2,476,637 | 7/1949 | Strain | 260—463 |
| 2,757,191 | 7/1956 | Stilmar | 260—463 |
| 2,900,368 | 8/1959 | Stilmar | 260—77.5 |
| 2,933,477 | 4/1960 | Young et al. | 260—77.5 |
| 2,933,478 | 4/1960 | Young et al. | 260—77.5 |
| 2,987,494 | 6/1961 | Black | 260—77.5 |
| 2,990,379 | 6/1961 | Young et al. | 260—77.5 |
| 3,051,687 | 8/1962 | Young et al. | 260—77.5 |
| 3,169,945 | 2/1965 | Young et al. | 260—77.5 |
| 3,186,971 | 6/1965 | Young et al. | 260—77.5 |
| 3,227,730 | 1/1966 | Goldsmith et al. | 260—77.5 |
| 3,240,730 | 3/1966 | Hostettlen et al. | 260—2.5 |

GEORGE F. LESMES, *Primary Examiner.*

MURRAY TILLMAN, *Examiner.*

P. LIEBERMAN, *Assistant Examiner.*